Patented Dec. 23, 1930

1,786,075

UNITED STATES PATENT OFFICE

CHARLES MARTELL, OF CICERO, ILLINOIS, ASSIGNOR TO WESTERN ELECTRIC COMPANY, INCORPORATED, OF NEW YORK, N. Y., A CORPORATION OF NEW YORK

METHOD OF RECLAIMING OR IMPROVING GUM EXUDATES

No Drawing.      Application filed May 6, 1925.   Serial No. 28,511.

This invention relates to methods of reclaiming or improving gum exudates, particularly methods of reclaiming or improving gutta percha, and has for its main object the provision of an improved method whereby inferior grades of such material may quickly and economically be fitted for commercial use.

The method consists primarily in masticating an oxidized or inferior grade of coagulated gum exudate in the presence of rubber latex, the masticating process having the effect of reclaiming or improving the exudate, the water in the latex functioning at the same time to wash the material and thereby remove extraneous or introduced impurities, such as earth and the like.

In order to explain more in detail the manner in which the process is carried out, specific reference will be made to its use for the purpose of reclaiming or improving inferior grades of gutta percha. This material is composed primarily of the hydrocarbon, "gutta", with a comparatively large percentage of various forms of resins. When it has been exposed, however, to the air for any great length of time the gutta may oxidize, thereby producing an additional resin which further increases the resin content of the gutta percha. Therefore, gutta percha may be of a great many different grades, each having a different percentage of resin. When working with such materials it is sometimes desirable to keep the proportion of pure gutta as near as possible to a standard and this is done, in some instances, by deresinating some of the gutta percha and then mixing it with other grades of gutta percha to produce the grade desired.

In addition to the resin content of gutta percha the material as marketed is frequently found to contain comparatively large amounts of foreign matter, such as leaves, twigs, earth and other similar substances, which make it necessary to wash the gum thoroughly before it is fit for use. A very great difficulty is experienced when dirty gutta percha, which at the same time has a high resin content, must be prepared for commercial use. The resin has the effect of making the gutta percha very adhesive and tacky and the result is that when an attempt is made to wash the material the dirt will not readily loosen and the material adheres to the masticating or washing apparatus in a way which makes the washing difficult.

This difficulty may be overcome by following the process embodying the features of this invention, the gutta percha being placed in a suitable masticator with a quantity of rubber latex and then masticated in the presence of the latex. The effect is that the gum in the latex is absorbed by or agglomerated with the gutta percha, an intimate mixture of the two materials being obtained, and the water present removes the foreign matter by its detergent action. When this method is employed a grade of gutta percha which is tacky and lacking in strength may be masticated in the manner described after which it presents the appearance of a normally good grade of gutta percha and possesses all of the desirable characteristics of such a grade. Although the process is of particular advantage in the treatment of a material which is both resinous and contains foreign matter, which material would probably otherwise be unfit for use, a medium or inferior grade of clean gutta percha which is objectionable only from the standpoint of the resin content can be reclaimed and improved in such a way as to make it approach in its characteristics the better grades of gutta percha.

As a specific example a quantity of gutta percha which had become so oxidized as apparently to be entirely worthless and from which the dirt could not be removed readily by other known methods because of the stickiness of the mass, was masticated in rubber latex in accordance with the present invention until it had absorbed about 12% of the gum in the rubber latex. The material was then found to be in an improved condition and appeared as a good grade of unoxidized gutta percha low in resin content. Equally goods results may be obtained in reclaiming or improving inferior or deteriorated grades of balata and rubber. Similar results were obtained in the reclaiming of balata, for instance, as in the reclaiming of gutta percha, that is, where the material was very badly oxidized an absorption of about 12% of rubber imparted to it the characteristics of new unoxidized material.

Although good results are obtained by the use of rubber latex as described, where it is preferable that the gum exudate have characteristics not producible by treatment with rubber latex, a latex of the same origin as the gum exudate employed may be used. For instance, where gutta percha is sought to be improved and must be kept pure for some reason, if the added expense is warranted, gutta latex may be used in the manner described. Whatever class of latex is employed, however, it may be of a natural or an artificial origin and, if vulcanizable, it may be vulcanized or unvulcanized as desired.

As noted above the process may be employed in the treatment of so-called "dirty" grades of materials or in the reclaiming only of such materials as are free from extraneous matter. The language of the appended claims is made to refer to the treatment of either class of material, the word "inferior" being used to refer to both conditions in such materials.

What is claimed is:

1. A method of reclaiming an inferior unvulcanized gum exudate, which consists in treating the gum exudate in the presence of a relatively small quantity of latex until a quantity of the gum in the latex has been absorbed by the gum exudate.

2. A method of reclaiming an inferior unvulcanized gum exudate, which consists in treating the gum exudate in the presence of a relatively small quantity of latex of the same origin as the gum being treated until a quantity of gum in the latex has been absorbed by the gum exudate.

3. The method of reclaiming an inferior unvulcanized gum exudate, which consists in treating the gum exudate in the presence of a relatively small quantity of rubber latex until a quantity of gum in the rubber latex has been absorbed by the gum exudate.

4. A method of reclaiming an inferior grade of gutta percha, which consists in treating the gutta percha in the presence of latex until a quantity of the gum in the latex has been absorbed by the gutta percha.

5. A method of reclaiming an inferior grade of gutta percha, which consists in treating the gutta percha in the presence of rubber latex until a quantity of the gum in the rubber latex has been absorbed by the gutta percha.

6. A method of reclaiming an inferior gum exudate, which consists in treating the gum exudate with a gum-containing material which acts as a detergent, and simultaneously therewith improves the quality of the gum exudate.

7. A method of reclaiming inferior gutta percha, which consists in treating the gutta percha with a gum-containing material which acts as a detergent, and simultaneously therewith increases the quality of the gutta percha.

8. The method of reclaiming an inferior gum exudate, which consists in treating the gum exudate with a gum-containing material which acts as a detergent and simultaneously therewith increases the gum content of the gum exudate.

9. The method of reclaiming inferior gutta percha, which consists in treating the gutta percha with a gum-containing material which acts as a detergent and simultaneously therewith increases the gum content of the gutta percha.

10. A method of treating an unvulcanized gum exudate, which consists in masticating the gum exudate in the presence of latex until a quantity of the gum in the latex agglomerates with the gum exudate.

11. A method of treating an unvulcanized gum exudate, which consists in working the gum exudate in the presence of latex, thereby causing the liquid of the latex to act as a detergent upon the gum exudate and causing a quantity of the gum in the latex to agglomerate with the gum exudate.

12. A method of treating an unvulcanized gum exudate other than rubber, which consists in masticating the gum exudate in the presence of latex until a quantity of the gum in the latex agglomerates with the gum exudate.

13. A method of treating an unvulcanized gum exudate other than rubber, which consists in working the gum exudate in the presence of latex thereby causing the liquid of the latex to act as a detergent upon the gum exudate and causing a quantity of the gum in the latex to agglomerate with the gum exudate.

14. A method of treating an unvulcanized gum exudate selected from the group including gutta percha, balata, and mixtures of the two, which consists in working the gum exudate in the presence of latex thereby causing the liquid of the latex to act as a detergent upon the gum exudate and causing a quantity of the gum in the latex to agglomerate with the gum exudate.

In witness whereof, I hereunto subscribe my name this 28th day of April A. D., 1925.

CHARLES MARTELL.